US011542384B2

(12) United States Patent
Ryan et al.

(10) Patent No.: US 11,542,384 B2
(45) Date of Patent: Jan. 3, 2023

(54) STABILIZED ADDITIVE MANUFACTURING ARTICLES (71) Applicant: Ford Global Technologies, LLC, Dearborn, MI (US)

(72) Inventors: Emily Ann Ryan, Allen Park, MI (US); Mark Edward Nichols, Saline, MI (US); Ellen Cheng-Chi Lee, Ann Arbor, MI (US); Christopher Michael Seubert, New Hudson, MI (US); Deborah Frances Mielewski, Ann Arbor, MI (US); Nicholas Ryan Gunther, Royal Oak, MI (US); Matthew Linden Bedell, Houston, TX (US)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 16/498,439

(22) PCT Filed: Jan. 15, 2018

(86) PCT No.: PCT/US2018/013731
§ 371 (c)(1),
(2) Date: Sep. 27, 2019

(87) PCT Pub. No.: WO2018/182821
PCT Pub. Date: Oct. 4, 2018

(65) Prior Publication Data
US 2021/0087357 A1 Mar. 25, 2021

Related U.S. Application Data (60) Provisional application No. 62/477,799, filed on Mar. 28, 2017.

(51) Int. Cl.
| C08F 2/46 | (2006.01) |
| C08F 2/50 | (2006.01) |
| C08G 61/04 | (2006.01) |
| C08K 5/3435 | (2006.01) |
| B33Y 70/00 | (2020.01) |
| B33Y 80/00 | (2015.01) |
| B29C 64/124 | (2017.01) |
| B29K 105/00 | (2006.01) |

(52) U.S. Cl.
CPC ............ C08K 5/3435 (2013.01); B33Y 70/00 (2014.12); B33Y 80/00 (2014.12); *B29C 64/124* (2017.08); *B29K 2105/0044* (2013.01)

(58) Field of Classification Search
CPC .......... C08K 5/3435; B29K 2105/0044; B29C 64/124; B33Y 70/00; B33Y 80/00
USPC ........... 522/40, 33, 6, 71, 189, 184, 1; 520/1
See application file for complete search history.

(56) References Cited

U.S. PATENT DOCUMENTS

| 5,112,890 | A | 5/1992 | Behrens et al. |
| 6,099,787 | A | 8/2000 | Melisaris et al. |
| 7,632,547 | B2 | 12/2009 | Weingartz |
| 8,227,048 | B2 | 7/2012 | Leyden et al. |
| 2006/0025534 | A1 | 2/2006 | Johnson et al. |
| 2008/0258345 | A1 | 10/2008 | Bens et al. |
| 2009/0004579 | A1 | 1/2009 | Sarmah et al. |
| 2009/0274922 | A1 | 11/2009 | Roys et al. |
| 2009/0318619 | A1 | 12/2009 | Berzon |
| 2012/0259031 | A1 | 10/2012 | Dake et al. |
| 2014/0113075 | A1 | 4/2014 | Maillot et al. |
| 2014/0131908 | A1* | 5/2014 | Sun ........................ B33Y 80/00 264/16 |
| 2015/0104624 | A1 | 4/2015 | Jang et al. |
| 2016/0068707 | A1 | 3/2016 | Drijfhout |
| 2016/0128909 | A1 | 5/2016 | Fontein et al. |
| 2016/0177130 | A1* | 6/2016 | Savage ................. F41H 5/0414 428/339 |
| 2016/0257831 | A1* | 9/2016 | Hirade ................. C09D 11/322 |
| 2016/0369096 | A1 | 12/2016 | Rolland et al. |
| 2017/0096580 | A1* | 4/2017 | Lee ........................ C08F 220/32 |
| 2017/0218222 | A1 | 8/2017 | Bos et al. |

FOREIGN PATENT DOCUMENTS

| CN | 101163736 A | 4/2008 |
| CN | 104910613 A | 9/2015 |
| DE | 102004034416 A1 | 2/2006 |
| DE | 102008017106 A1 | 10/2009 |
| EP | 0322556 A1 | 7/1989 |
| FR | 3022250 A1 | 12/2015 |
| KR | 20060124431 A | 12/2006 |

(Continued)

OTHER PUBLICATIONS

Hong et al, KR 1020060124431 Machine Translation, Dec. 5, 2006 (Year: 2006).*
Schwalm, Reinhold. UV Coatings Basics, Recent Developments and New Applications. Elsevier Science. Dec. 21, 2006. 316 pages.
Carola Tröger et al. Ageing of acrylate-based resins for stereolithography: thermal and humidity ageing behaviour studies. Rapid Prototyping Journal. vol. 14, No. 5, pp. 305-317, 2008. 5 pages.
Akafuah, Nelson K. Evolution of the Automotive Body Coating Process—A Review. MDPI Open Access Journals. Jun. 13, 2016. 36 pages.

(Continued)

*Primary Examiner* — Jessica Whiteley
(74) *Attorney, Agent, or Firm* — Vincent Mastrogiacomo; Brooks Kushman P.C.

(57) ABSTRACT

An additive article stabilizing method includes prior to polymerization, adding a radiation-activated stabilizing composition to a liquid resin, forming the article from the liquid resin, layer by layer, using radiation such that the stabilizing composition does not stabilize the liquid resin but the formed article, and neutralizing free radicals generated during a degradation process initiated by exposure of the article to additional radiation post-cure.

20 Claims, 3 Drawing Sheets

(56) References Cited

FOREIGN PATENT DOCUMENTS

| KR | 1020060124431 | * | 12/2006 | |
| WO | WO-9617012 A1 | * | 6/1996 | ............ H01L 31/055 |
| WO | 2013153183 A | | 10/2013 | |
| WO | 2014078537 A1 | | 5/2014 | |
| WO | 2016019078 A1 | | 2/2016 | |
| WO | 2016149151 A1 | | 9/2016 | |
| WO | 2016181149 A1 | | 11/2016 | |
| WO | 2017051182 A1 | | 3/2017 | |
| WO | WO-2017051182 A1 | * | 3/2017 | ............. G03F 7/029 |
| WO | WO-2018069530 A1 | * | 4/2018 | ............ C08K 5/3492 |

OTHER PUBLICATIONS

Racing Ahead with UV/EB Curing. UV+EB Technology RadTech; The Association for UV/EB Technology. 2017 Quarter 1 vol. 3, No. 1. Issue 1, 2017. 60 pages.

Cliff, Nancy et al. Use of Reactable Light Stabilizers to Prevent Migration and to Improve Durability of Coatings on Plastic Substances. JCT Research. vol 2, No. 5. Jan. 2005.

Yaneff, Philip V. et al. Migration of Reactable UVAs and HALS in Automotive Plastic Coatings. JCT Research. vol. 1, No. 3. Jul. 2004.

BASF targets automotive interiors and artificial turf with new HALS light stabilizers. Additives for Polymers. vol. 2016, Issue 9, Sep. 2016.

Stabilizers for Coatings Applications Overview—Hostavin Hostanox. Clariant International Ltd. Rothausstrasse 61, 4132 Muttenz, Switzerland. 2015. 16 pages.

Zhang Yongtao et al. Study on photostabilization in situ of reactive hindered amine light stabilizers applied to UV-curable coatings. Department of Polymeric Materials and Engineering, Facutly of Materials, and Energy, Guangdong University of Technology, Guanzhou, 510006, Peoples Republic of China. J. Coat Technol. Res. 9 (4) 459-466, 2012. 8 pages.

Nikafshar, Saeid et al. The Effects of UV Light on the Chemical and Mechanical Properties of a Transparent Epoxy-Diamine System in the Presence of an Organic UV Absorber. MDPI Open Access Journals. Feb. 14, 2017. 18 pages.

Jipa, Silviu et al. Chemiluminesence study on HALS antioxidant activity in LDPE. Polymer Bulletin, Springer, Berlin, DE. vol. 57, No. 4. May 23, 2006. 8 pages.

Büsgen, Thomas. Plastics for Additive Manufacturing. Bayer Materials Science AG. 3D Printing & Additive Manufacturing Industrial Applications Summit 2013, London. Nov. 20, 2013. 16 pages.

Paesano, Antonio. Polymeric Additive Manufacturing: Present Status and Future Trends of Materials and Process. Boeing Technical Journal. 2016. 12 pages.

UV post-cure for 3D printing. May 11, 2016.

International Search Report for International Application No. PCT/US2018/024754, Completed by the International Patent Office, dated Jun. 13, 2018, 10 pages.

International Search Report for International Application No. PCT/US2018/137731, Completed by the International Patent Office, dated Apr. 5, 2018, 2 pages.

International Search Report for International Application No. PCT/US2018/024752, Completed by the International Patent Office, dated Jun. 21, 15 pages.

Puebla, Karina et al. Effects of environmental conditions, aging, and build orientations on the mechanical properties of ASTM type I specimens manufactured via stereolithography. Rapid Prototyping Journal. Emerald Group Publishing Limited. vol. 18, No. 5, 2012. 374-388. 15 pages.

Mansour, S. et al. A study of the impact o short-term ageing on the mechanical properties of a stereolithography resin. Materials Science and Engineering A. 2006 Elsevier B.V. 277-284.

* cited by examiner

FIG. 1

Row A

Row B

FIG. 2

Row C

Row D

STABILIZED ADDITIVE MANUFACTURING ARTICLES

CROSS REFERENCE TO RELATED APPLICATION

This application is a U.S. National Phase of PCT Application No. PCT/US2018/013731 filed on Jan. 15, 2018, which claims the benefit of U.S. Provisional Application Ser. No. 62/477,799 filed Mar. 28, 2017, now expired, the disclosure of which is incorporated in its entirety be reference herein.

TECHNICAL FIELD

The disclosure relates to forming stabilized articles formed by additive manufacturing methods such as UV-cured additive manufacturing processes.

BACKGROUND

Additive manufacturing is becoming more affordable and capable of producing an ever-increasing plethora of articles, including components which could be potentially utilized in the automotive industry. Yet, the additive manufacturing methods need improvements with respect to mechanical properties, weathering, and/or durability of the formed articles.

SUMMARY

A method including mixing a stabilizing composition with a monomer bath to form a mixture, the composition including one or more hindered amine light stabilizers, and forming a 3-D article by an additive manufacturing process from the mixture such that the one or more hindered amine light stabilizers remain inactive until after the 3-D article is formed.

In at least one embodiment, an additively manufactured article stabilizing method is disclosed. The method includes prior to polymerization, adding a radiation-activated stabilizing composition to a liquid resin. The method further includes forming the article from the liquid resin, layer by layer, using radiation such that the stabilizing composition does not stabilize the liquid resin but the formed article. The method also includes neutralizing free radicals generated during a degradation process initiated by exposure of the article to additional radiation post-cure. The additional radiation is a greater amount of radiation than an amount of radiation needed for initial polymerization and cure of the article. The stabilizing composition may include one or more slow-acting compounds that do not actively inhibit free radical activity before or during polymerization and cure. The one or more slow-acting compounds remain in their unreacted state for at least several weeks after the article is formed. The one or more slow-acting compounds do not absorb UV light directly at a wavelength of polymerization, cure, or both. The stabilizing composition may include hindered amine light stabilizers (HALS). The HALS may include one or more compounds from a class of tetramethyl piperidine derivatives. The forming may include UV cure, thermal cure, or both.

In an alternative embodiment, a liquid resin for additively manufacturing an article is disclosed. The liquid resin includes (A) light stabilizer(s) based on one or more hindered amine light stabilizers (HALS), (B) reactive diluent(s) and/or (C) solvent(s), (D) photoinitiator(s), and optional components (E) antioxidant(s), (F) UV light screener(s), wherein the liquid resin is to be polymerized by radiation and (A) remains in an unreacted state during the polymerization and cure of the article. The component (A) may include one or more HALS from a class of tetramethyl piperidine derivatives. The component (A) may include 2,2,6,6-Tetramethyl-4-piperidinol. The composition may include 0.1 to 5 wt. % of component (A), based on total weight of the liquid resin. The radiation may be UV light.

In an alternative embodiment, an automotive article is disclosed. The article includes stratified layers defining the automotive component comprising slow-acting compounds configured to neutralize free radicals generated during a degradation process initiated by exposure of the article to radiation post-manufacturing such that the slow-acting compounds are incorporated in the stratified layers through the article. The article may be incorporated into an interior of a vehicle cabin. The radiation may be UV radiation, thermal radiation, or both. The post-manufacturing may include a time period after polymerization of a liquid resin used to form the article, cure of the article, or both. The slow-acting compounds may be incorporated in a core of the article. The article may be a stabilized article in compliance with an exterior weathering test procedure ASTM D7869, resistance to interior weathering ISO 105 A-02, SAE J2412, soiling and cleanability ISO 105-A03, fogging SAE J1756, flammability ISO 3795, or a combination thereof. The article may be a console in an automotive interior.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Additive manufacturing processes relate to technologies that build 3-D objects by adding layer upon layer of material. The material may be plastic, metal, concrete, or the like. Additive manufacturing includes a number of technologies such as 3-D printing, rapid prototyping, direct manufacturing, layered manufacturing, additive fabrication, vat photopolymerization including stereolithography (SLA) and digital light processing (DLP), material jetting, binder jetting, material extrusion, powder bed fusion, sheet lamination, directed energy deposition, and the like. All additive manufacturing technologies operate according to a similar principle. Additive manufacturing utilizes a computer, 3-D modeling software (Computer Aided Design or CAD), a machine capable of applying material to create a layered article, and the layering material. A virtual design of the object is created in a CAD file using a 3-D modeling program or with the use of a 3-D scanner which makes a 3-D digital copy of the desired object. The digital file can be sliced, with each slice containing data so that the object may be formed layer by layer. The machine applying the layering material reads every slice, adds successive layers of the layering material in liquid, powder, or sheet format, and forms the object while joining each layer with the next layer so that there are hardly any visually discernable signs of the discreetly applied layers. The layers form the three-dimensional solid object. The additively manufactured item may need to undergo one or more post-processing steps to yield the final 3-D object.

Early additive manufacturing focused on pre-production visualization models, fabricating prototypes, and the like. The quality of the fabricated articles determines their use and vice versa. The early articles formed by additive manufacturing were generally not designed to withstand long-term use. The additive manufacturing equipment was also expensive, and the speed was a hindrance to a widespread use of additive manufacturing for high volume applications. But recently, additive manufacturing processes have become faster and less expensive. While additive manufacturing technologies have improved regarding the quality of the fabricated articles, the technology still faces obstacles in this area. Thus, additive manufacturing provides a significant opportunity with respect to manufacturing of inexpensive prototypes or other parts which are not strictly regulated with respect to their mechanical properties. But automotive components are subject to stringent requirements that the articles formed with current additive manufacturing processes and materials may not meet.

For example, a group of articles formed by additive manufacturing utilizes free radical chemistry to convert the liquid resin to a solid polymer in the shape of the article. Liquid resin and monomer bath are used interchangeably in the disclosure. Free radical polymerization is a method of polymerization by which a polymer forms by the successive addition of monomer units from the monomer bath to a radical chain. Free radicals can be formed via a number of different mechanisms usually involving separate initiator molecules. Following its generation, the initiating free radical adds nonradical monomer units, thereby growing the polymer chain. Free radical polymerization is a key synthesis route for obtaining a wide variety of different polymers and material composites. To initiate the polymerization, radicals are formed. This may be done, for example, by heating the initiator until a bond is homolytically cleaved. Alternatively, UV radiation may be used to cleave a bond, producing free radicals.

Still, the polymerization reactions and chemical changes to the polymer may continue after production as the article may continue to contain reactive components which are capable of cross-linking, or the polymer itself may not be stable with respect to environmental conditions. The reactive components may include, for example, reactive diluents, photoinitiators, or the like. In addition, the components forming the article may continue to either cross-link or degrade when exposed to radiation such as UV light, LED light, daylight, elevated temperatures, humidity, or a combination thereof. As a result of this photo-degradation, photo oxidation, thermo-oxidation, or a combination thereof, the article may undergo disintegration, embrittlement, shrinkage, warping, discoloration, accelerated weathering, or a combination thereof. Consequently, such articles may not pass the standard heat/humidity, or UV exposure tests and/or other standards which are required for durable articles as the free radical chemistry and other degradative processes continue to occur within the article before, during, and/or after the tests.

Figure 1:
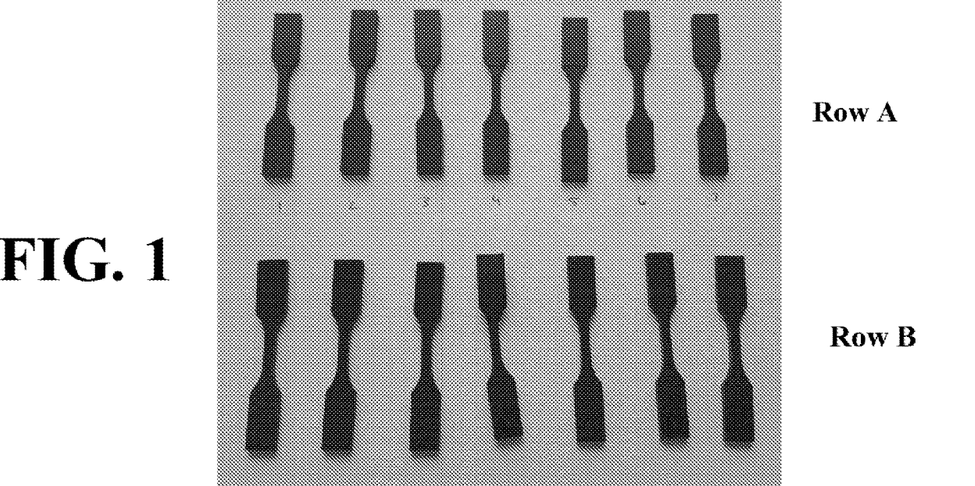
FIGS. 1 and 2 are photographs of four sets of polyurethane (PU) samples, some of which were exposed to an automotive exterior accelerating weathering cycle equal to 1 year of Florida exposure.
Figure 2:
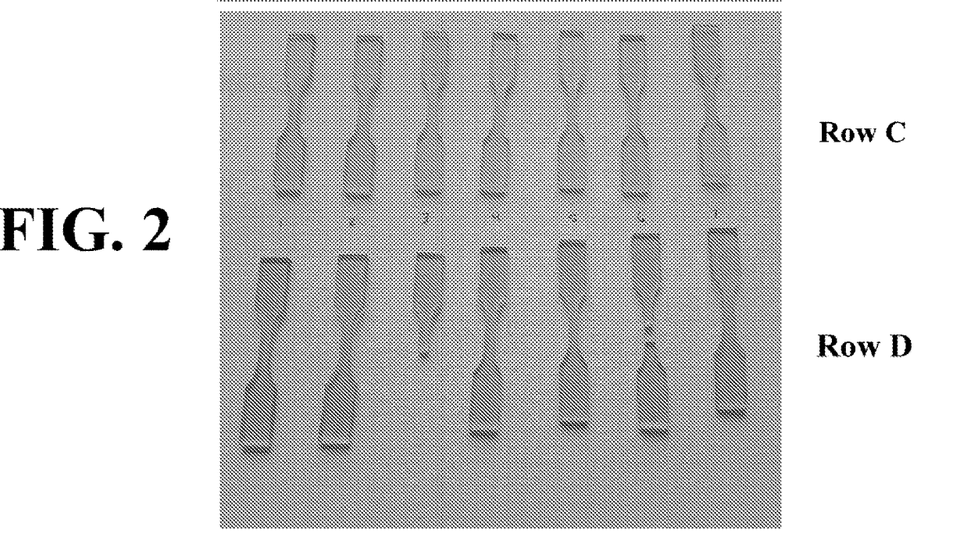

Examples of weathering effects due to UV exposure are demonstrated on examples of polyurethane (PU) depicted in FIGS. 1 and 2. FIG. 1 shows two sets of samples made from rigid PU by additive manufacturing, samples 1-7 in row A and samples 1-7 in Row B. The samples in Row A were not exposed to an accelerated weathering environment post-production. The samples in Row B were exposed to an automotive exterior accelerating weathering cycle for 750 hours, equivalent to 1.0 year of Florida exposure, post-production. Similarly, FIG. 2 shows two sets of samples made from flexible PU by additive manufacturing, samples 1-7 in row C and samples 1-7 in Row D. The samples in Row C were not exposed to an accelerated weathering environment post-production. The samples in Row D were exposed to an automotive exterior accelerating weathering cycle for 750 hours post-production. All samples in Rows B and D, which were exposed to an accelerated weathering environment, showed severe decrease in mechanical properties, discoloration, and warpage (Sample 4, Row B) compared to samples in Rows A and C which were unexposed to UV light. The test was conducted according to a weathering test procedure ASTM D7869. Table 1 below illustrates decrease in the mechanical properties of the PU samples post-exposure to UV light.

TABLE 1

| Sample | Material | Exposure level [hrs.] | Young's Modulus [MPa] | Load at Yield [MPa] | Elongation at Yield [%] | Elongation at Break [%] | Load at Break [MPa] | Color/Translucency |
|---|---|---|---|---|---|---|---|---|
| Samples 1-7, Row A | Rigid PU | 0 | 1670 | 40-43 | 4-5 | 50 | 30 | Black, not translucent |
| Samples 1-7, Row B | Rigid PU | 750 | 1670 | 19-21 | 1-2 | 1-2 | 20 | Black, not translucent |
| Samples 1-7, Row C | Flexible PU | 0 | — | 15-20 | 8-10 | 200 | 20 | Light blue, good translucency |
| Samples 1-7, Row D | Flexible PU | 750 | — | 16-18 | 4 | 6-10 | 18 | Yellow-green, compromised translucency |

Yet, it would be attractive to utilize the now-affordable additive manufacturing to produce automotive components, especially customized parts, and parts with highly complex geometries, which may be difficult or costly to manufacture by alternative techniques. Thus, it would be desirable to provide articles manufactured by additive manufacturing methods which would meet the rigorous standards of the automotive industry with respect to the component quality, durability, environmental safety, resistance to moisture, pressure, and/or other requirements relating to physical, chemical, mechanical, and/or optical properties.

A number of solutions to the problem recited above have been proposed for polymeric articles produced by traditional methods not including additive manufacturing. Most of the proposed methods are not suitable for additive manufacturing. For example, 3-D-printed articles are typically primed and coated with UV-stable compositions such as paints. But such a solution is costly, time consuming, and may be difficult to provide on articles of complex shapes which may be produced by additive manufacturing methods, especially SLA and DLP techniques. In addition, the use of the coatings may present an environmental concern.

In one or more embodiments, a method for stabilizing the properties of an article formed by additive manufacturing is disclosed. The method may be applicable to any article formed by any method of additive manufacturing utilizing free radical chemistry to initiate polymerization, cationic polymerization, which may be initiated by UV radiation, condensation polymerization initiated by photolatent bases or acids, and the like. In other words, the method described herein relates to an article formed by any additive manufacturing method utilizing radiation, photoinitiation, thermal initiation, photocure, thermal cure, or a combination thereof. Thus, any additive method utilizing radiation is contemplated. The radiation may be UV radiation, visible light radiation, or infrared radiation.

Figure 3:
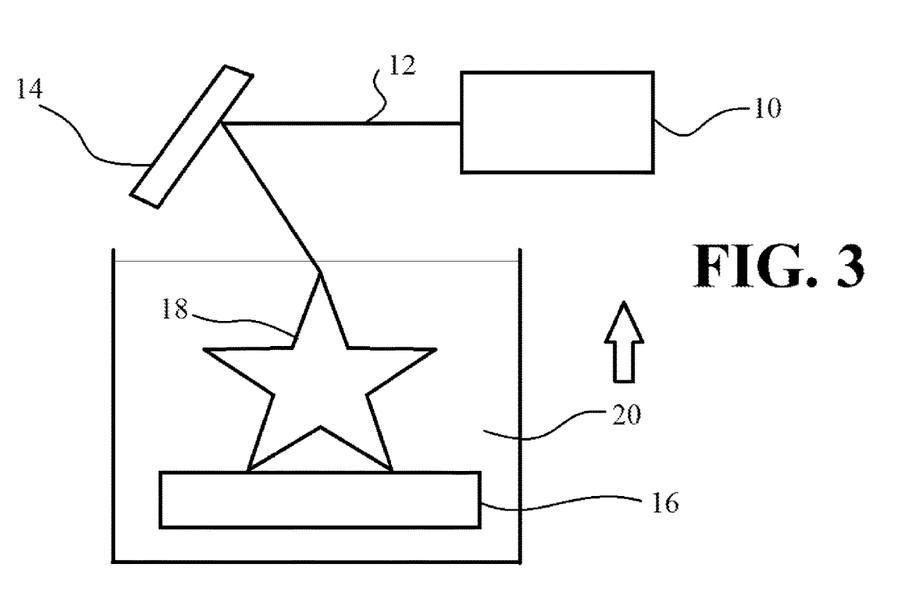
FIG. 3 depicts a non-limiting schematic example of a stereolithography (SLA) additive manufacturing system.
Figure 4:
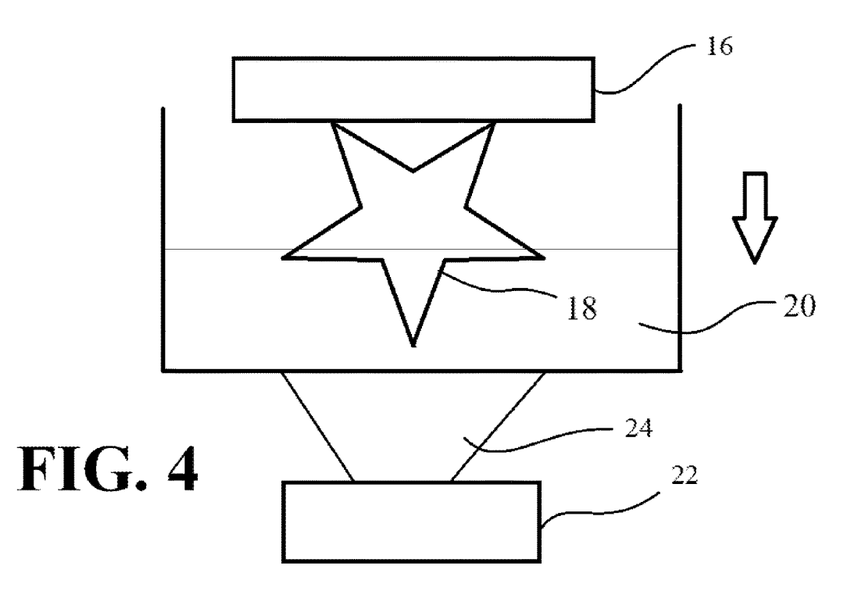
FIG. 4 depicts a non-limiting schematic example of a digital light processing (DLP) additive manufacturing system.

An example additive manufacturing technology utilizing radiation is laser-based SLA or DLP. Non-limiting examples of SLA and DLP systems are schematically depicted in FIGS. 3 and 4, respectively. Both SLA and DLP use light to turn a liquid resin into a solid article, a layer at a time. UV light it utilized to cause polymerization. SLA uses two motors, known as galvanometers or galvos, (one on the X axis and one on the Y axis) to rapidly aim a laser beam across the print area, solidifying the resin as it progresses. This process breaks down the design, layer by layer, into a series of points and lines that are given to the galvos as a set of coordinates. As FIG. 3 shows, a UV laser source 10 provides a laser beam 12, which is reflected on a mirror 14 towards the platform 16, on which the solid article 18 is being formed, layer by layer, from the liquid resin 20. The arrow shows the direction in which the article 18 is being built. The shape of the depicted article is only a non-limiting example in both FIGS. 3 and 4.

In contrast, DLP uses a digital projector screen to project a single image of each layer across the entire platform at once. Because the projector is a digital screen, the image of each layer is composed of square pixels, resulting in a layer formed from small rectangular bricks called voxels. In comparison with SLA, DLP may achieve faster print times for some parts as each entire layer is exposed at once rather than drawn out with a laser. Since DLP resolution depends on the projector while a SLA printer's build volume is somewhat independent from the resolution of the print, the choice of a specific additive manufacturing technology depends on the complexity, size, and number of components to be manufactured.

FIG. 4 shows schematically a DLP system having the UV light source 22 projecting a single image of each layer as the projected image 24 across the building platform 16 on which the solid article 18 is being formed, layer by layer, from the liquid resin 20. The arrow shows the direction in which the article 18 is being built.

While SLA and DLP are mentioned, the two named technologies are only example technologies and the methods described herein may likewise be applicable in other additive manufacturing techniques. After the polymerization, the formed article may be exposed to elevated temperature to continue or expedite cross-linking. While SLA and DLP are mentioned, other additive manufacturing methods are contemplated.

Stabilizing relates to adjusting, modifying, enhancing, altering, securing, maintaining, preserving, balancing, or changing of one or more properties of the article formed by additive manufacturing such that the formed article meets predetermined standards post-manufacturing. The stabilized article complies with automotive testing methods such as an exterior weathering test procedure ASTM D7869, resistance to interior weathering ISO 105 A-02, SAE J2412, soiling and cleanability ISO 105-A03, fogging SAE J1756, flammability ISO 3795, and/or other tests such as impact resistance at room temperature, scratch resistance, odor testing, stress cracking.

The stabilized article may remain in compliance with the standards for several hours, days, weeks, months, years, or decades after manufacturing. The property that is degraded may relate to physical, chemical, optical, and/or mechanical properties. The properties may include dimensional stability, functionality, durability, wear-resistance, fade-resistance, chemical-resistance, water-resistance, UV-resistance, thermal resistance, memory retention, desired gloss, color, mechanical properties such as toughness, strength, flexibility, extension, the like, or a combination thereof.

Figure 5:
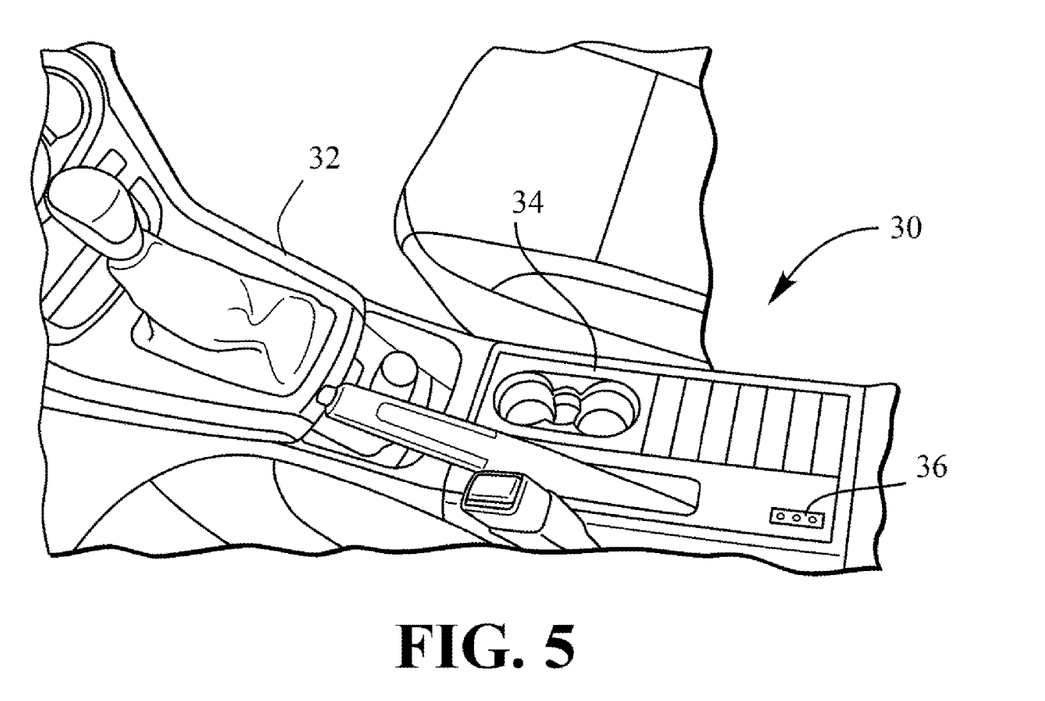
FIG. 5 shows a non-limiting example of an automotive interior with at least some of the parts which may be formed according to the disclosed methods and materials.

The article may be any article utilized in the automotive industry which may be produced by additive manufacturing. The article may be any suitable component in any vehicle. Non-limiting example types of applicable vehicles include land vehicles such automobiles, buses, vehicles for transportation of goods, motorcycles, off-road vehicles, tracked vehicles, trains, amphibious vehicles, aircrafts, space crafts, watercrafts, or the like. The suitable component may be an interior trim, handle(s), knob(s), bracket(s), console component(s), cup holder(s), gasket(s), electrical connector(s), and the like. The suitable component may also be an unpainted exterior article such as an exterior trim or a decorative or personalized design component. A non-limiting example of an automotive interior with at least some of the components 30 produced by the disclosed methods is depicted in FIG. 5. For example, FIG. 5 shows a console 32, a cup holder 34, and other finer components 36 which may be produced by the methods and materials described herein.

The article may be made from any material capable of being formed into a 3-D article by additive manufacturing in which polymerization is initiated by radiation such as thermal, UV, or LED radiation. The material may include plastic material such as a thermoset or thermoplastic. The material may include polyurethane, polyacrylate, polyacetate, polystyrene, polypropylene, polyethylene, polyvinylchloride, polyester, silicone, rubber, bio-based polymers incorporating at least one bio-based component such as epoxidized vegetable, seed, or animal-fat oil, etc. The article may be made from one type of material or a mixture of materials.

The method includes stabilizing the article to be formed by adjusting chemical composition of the monomer bath or resin used to form the article. The resin may contain monomers, oligomers, polymers, or a combination thereof. Stabilizing may include adjusting chemistry of the monomer bath or resin by adding a stabilizing composition or stabilizer additive(s) to the monomer bath or resin before polymerization. The stabilizing composition does not stabilize the monomer bath or liquid resin, but the article formed from the liquid resin. The stabilizing composition and/or its derivatives neutralize free radicals generated during a degradation process initiated by exposure of the article to radiation post-manufacturing. Thus, while the stabilizing composition is added to the monomer bath before the article is formed, the composition does not start fulfilling its neutralizing function until the article is exposed to excessive radiation over an extended period of time, that is until the degradation process begins post-cure. Excessive radiation relates to a greater amount of radiation than the amount of radiation needed for polymerization and cure of the article. The radiation may be solar radiation. An extended period of time relates to one or more hours, days, weeks, months, or longer. The choice of individual components of the stabilizing composition is thus directed to slow-acting compounds which do not actively inhibit free radical activity before or during polymerization and cure. A slow-acting compound may remain in its unreacted or inactive state for several minutes, hours, days, weeks, or months after being added to the composition and/or the monomer bath and/or after the article is formed.

The amount of the stabilizing composition to be added to the monomer bath depends on the dimensions of the article to be formed, its intended use, environmental conditions the article is to be exposed to, geographical location the article may be used in, effectiveness of the stabilizing composition and its components, solubility limits, the like, or a combination thereof. For example, if the article is to be exposed to radiation frequently, the amount of the stabilizing composition may be higher than if the article is to be incorporated in a portion of a vehicle which will not be frequently exposed to radiation.

The stabilizing composition may include one or more components. The components may be solid in the form of a powder, liquid, or both. The components may be added to the monomer bath or liquid resin in the form of a powder or liquid. Alternatively, one or more components of the stabilizing composition may be dissolved and added to the bath or liquid resin in a liquid form. The components should be miscible with the monomer bath or liquid resin such that the stabilizing composition components may be effectively added to the monomer bath or liquid resin, may be homogenized with the monomer bath or liquid resin, or both.

The components are stable before polymerization, during polymerization, and during exposure to the thermal cure temperatures such that the components do not negatively affect cure. The components should not interfere with the curing in any way. For example, the components should be chosen in such a way that the components do not screen the UV radiation utilized during the polymerization and/or cure. If the components screened at least a portion of the UV light, the length of the additive manufacturing process could be extended due to slower cure, longer printing, or other printability issues. Thus, a correct selection of the components such as HALS and/or UVA screeners, as is described below, includes choosing the components that do not absorb UV light directly at the wavelength of polymerization and/or cure. Such choice results in protection from other (non-cure) UV wavelengths during testing and use exposure of the article while the additive manufacturing process remains uninhibited. Alternatively, or in addition, the chosen compounds may absorb UV light at the wavelength of polymerization and/or cure, but the compounds do not affect polymerization and/or cure because the compounds act on a much longer time scale and thus remain inactive during polymerization and/or cure. The chosen compounds may thus absorb UV light in the wavelengths of about 10 to 400 nm, 100 to 400 nm, or 295 to 400 nm.

In addition, the components should be chosen such that the components have no or only minimal cross-reactivity with one another and with the monomer bath. Specific components are also chosen based on solubility in the monomer bath, absorption spectra, and other conditions. The composition should not negatively affect properties of the monomer bath and the formed article such as color stability, flexibility, low or no toxicity, environmental friendliness, the like, or a combination thereof.

The composition may include one or more components. While a single component may form the stabilizing composition, a combination of two or more components may provide enhanced stability of the article post-production. Example components include component (A), a light stabilizer component based on one or more hindered amine light stabilizers (HALS), component (B), a reactive diluent component, component (C), a solvent component, component (D), UV light screeners component, component (E), an antioxidant component, the like, or a combination thereof. Additional components are contemplated.

The composition may include component (A), a light stabilizer component based on one or more HALS. Component (A) is capable of neutralizing free radicals generated during the degradation process. Component (A) may include one or more HALS from the class of tetramethyl piperidine derivatives. HALS are chemical compounds including an amine functional group surrounded by a crowded steric environment. The advantage of using HALS lies in their high efficiency regarding stabilization of the article against light-induced degradation. Additionally, HALS are not consumed in the neutralization reaction. Rather, HALS are regenerated during the stabilization process. Thus, including component (A) enables long-term stabilization of the article.

A variety of HALS may be used. The chemistry and especially the type of end groups of the HAL determines kinetics of the stabilization reaction. A desirable HAL may be a slow-acting HAL such that component (A) remains inactive or has low reactivity until its neutralizing function becomes relevant when the formed article becomes exposed to radiation. HALS protect the formed article against long-term exposure at a variety of UV wavelengths which may include the wavelength of cure. The chemical process to quench free radicals HALS go through happens on a much longer time scale than polymerization. For example, while polymerization may last several seconds, HALS may start quenching free radicals one or more hours, days, weeks, or months after polymerization, formation of the article, and/or cure. As was stated above, HALS may quench free radicals at the wavelength of polymerization and/or cure, among other wavelengths, but due to their slow-acting nature, the polymerization and/or cure ends before HALS become active. HALS thus do not affect the mechanism of polymerization and/or cure.

The stabilizing composition including HAL(s) may represent about 0.1 to 5, 0.25 to 2.5, or 0.5 to 1 wt. %, based on the weight of the monomer bath. Since this amount is relatively low, printability of the liquid resin is not negatively affected.

Non-limiting example HALS may include 2,2,6,6-Tetramethyl-4-piperidinol; bis(2,2,6,6,-tetramethyl-4-piperidyl)sebacate (Tinuvin 770); bis (1,2,2,6,6-pentamethyl-4-piperidyl) sebacate and Methyl 1,2,2,6,6-pentamethyl-4-piperidyl sebacate (Tinuvin 292); decanedioic acid, bis (2,2,6,6-tetramethyl-1-(octyloxy)-4-piperidinyl) ester (Tinuvin 123); or bis (1,2,2,6,6-pentamethyl-4-piperidinyl)-[[3,5-bis (1,1-dimethylethyl)-4-hydroxyphenyl]methyl]butylmalonate (Tinuvin 144).

Since some HALS are produced in powdered form, a component (B) may be added to the stabilizing composition to solubilize the powders before they are added to the monomer bath. Component (B) may include one or more reactive diluents. Component (B) may also decrease viscosity and enhance cure during the additive manufacturing process.

Non-limiting examples of diluents include methyl methacrylates, acrylates, alkylene carbonates, methacrylics, the like, or a combination thereof. Component (B) may include methacrylate such as diethylene glycol methylacrylate, isoborynyl methacrylate, di(ethylene glycol) methyl ether methacrylate, the like, or a combination thereof.

Alternatively, or in addition to reactive diluents (B), a solvent component (C) may be used to solubilize HALS. Any solvent may be used, yet environmentally-friendly solvents represent a better option. Non-limiting examples of component (C) include alcohols, dichloromethane, chloroform, ethylene chloride, ethyl acetate, N-hexane, methanol, the like, or a combination thereof.

The composition may include additional components. In general, the composition may contain any component capable of adjusting any desirable property of the bath and/or the article as long as the component does not negatively affect properties of the monomer bath, the article or the curing process and remains inactive until exposure to an element causing degradation of the article.

For example, component (D), one or more UV light screeners or UV light absorbers may be added to the composition. UV screeners absorb radicals during UV exposure post-production. UV screeners need to be spectrum matched to the wavelength of polymerization and/or cure to prevent excessive absorption. Thus, component (D) has to be chosen from compositions which do not screen or absorb UV light in the wavelengths of the UV radiation used for the polymerization and/or cure process. Component (D) may be chosen such that the screening wavelength is less than about 370 nm. Component (D) with the absorption spectra that are lower may not interfere with the cure (UV-B/UV-C). Yet, longer wavelength systems (about 405 nm lasers) allow for a wider range of stabilization. The efficiency of the screening differs and may be about 10, 20, 30, 40, 50, 60, 70, 80, 90% of incoming UVA or more.

Non-limiting examples of component (D) include 2-(2-hydroxyphenyl)-benzotriazoles, hydroxyphenyl-s-triazines, 2-Hydroxy-benzophenones, oxanilide, the like, or a combination thereof. Non-limiting examples of component (D) include (2-[4-[(2-Hydroxy-3-dodecyloxypropyl)oxy]-2-hydroxyphenyl]-4,6-bis(2,4-dimethylphenyl)-1,3,5-triazine; 2-[4-[(2-Hydroxy-3-tridecyloxypropyl)oxy]-2-hydroxyphenyl]-4,6-bis(2,4-dimethylphenyl)-1,3,5-triazine) (Tinuvin 400); 2-Hydroxyphenyl-s-triazine (Tinuvin 405); proprietary Hydroxyphenyl-triazine (Tinuvin 479); 95% Benzenepropanoic acid, 3-(2H-benzotriazol-2-yl)-5-(1,1-dimethylethyl)-4-hydroxy-, C7-9-branched and linear alkyl esters, 5% 1-methoxy-2-propyl acetate (Tinuvin 99-2); 95% Benzenepropanoic acid, 3-(2H-benzotriazol-2-yl)-5-(1,1-dimethylethyl)-4-hydroxy-, C7-9-branched and linear alkyl esters, 5% 1-methoxy-2-propyl acetate (Tinuvin 384-2); 2-(2H-benzotriazol-2-yl)-4,6-bis (1-methyl-1-phenylethyl) phenol (Tinuvin 900); 50% β-[3-(2-H-Benzotriazole-2-yl)-4-hydroxy-5-tert.butylphenyl]-propionic acidpoly(ethylene glycol) 300-ester, b) 38% Bis{β-[3-(2-H-Benzotriazole-2-yl)-4-hydroxy-5tert.butylphenyl]-propionic acid}-poly(ethylene glycol) 300-ester, and c) 12% polyethylene glycol (Tinuvin 1130); (2-[4-[(2-Hydroxy-3-dodecyloxypropyl) oxy]-2-hydroxyphenyl]-4,6-bis(2,4-dimethylphenyl)-1,3,5-triazine; 2-[4-[(2-Hydroxy-3-tridecyloxypropyl)oxy]-2-hydroxyphenyl]-4,6-bis(2,4-dimethylphenyl)-1,3,5-triazine) (Tinuvin 400); 2-Hydroxyphenyl-s-triazine (Tinuvin 405); Proprietary Hydroxyphenyl-triazine (Tinuvin 479); the like, or a combination thereof.

The composition may also include component (E), an antioxidant component. Component (C) may include one or more compounds having antioxidant properties. Component (E) is capable of neutralizing effects of thermal degradation.

Thus, component (E) has to be chosen such that component (E) does not counter the effects of thermal cure. Component (E) may include p-phenylenediamine derivatives (N,N'-diaryl, N,N'-alkyl-aryl, N,N'-dialkyl), hindered phenolic compounds (BHT), octyl and higher alkyphenols, phosphites, the like, or a combination thereof. Component (E) may include 4,4'-butylidenebis(3-methyl-6-tert-butylphenol), butylated hydroxytoluene (BHT), trisonylphenol phosphite, tris(2,4-di-tertbutylphenyl phosphite, triphenyl phosphite, bis(2,4-dicumylphenyl) pentaerythritol, 2,2'-Methylenebis (4-methyl-6-tert-butylphenol), or a combination thereof.

The monomer bath into which the stabilizing composition is added may be adjusted to enable incorporation of the stabilizing composition. For example, viscosity of the monomer bath may be adjusted by an addition of one or more reactive diluents named above. Additionally, or in the alternative, curing rate may have to be enhanced by addition of a component, (F) one or more photoinitiators which convert absorbed UV light energy into chemical energy in the form of initiating species such as free radicals or cations. Photoinitiators initiate and/or catalyze the polymerization reaction of the monomer bath upon exposure of the bath to UV light. While the liquid resin may already contain one or more photoinitiators, the amount of the photoinitiator may have to be increased due to presence of HALS, UVAs, and/or other compounds that act at the wavelength of polymerization and/or cure.

The type of initiator used depends on the wavelength range in which they will activate. A UV light source emits in the 200 to 400 nm wavelength range. Thus, a photoinitiator absorbing in the 200 to 400 nm wavelength range may be used. Examples of suitable photoinitiators absorbing in this area include those with free radical initiating function, cationic initiating function, or both. The photoinitiators may thus polymerize through double bonds, epoxy groups, or both.

The photoinitiator may include benzoylphosphine oxides, aryl ketones, benzophenones, hydroxylated ketones, 1-hydroxyphenyl ketones, α-Aminoketone, α-Hydroxyketone, ketals, metallocenes, BAPO, MAPO, phosphine oxides, or a combination thereof. The photoinitiator may include benzoylphosphine oxides such as, for example, 2,4,6-trimethylbenzoyl diphenylphosphine oxide, 2,4,6-trimethylbenzoyl phenyl, ethoxy phosphine oxide, bis(2,4,6-trimethylbenzoyl)-phenylphosphineoxide, 2-methyl-1-[4-(methylthio) phenyl]-2-morpholinopropanone-1,2-benzyl-2-(dimethylamino)-1-[4-(4-morpholinyl)phenyl]-1-butanone, 2-dimethylamino-2-(4-methyl-benzyl)-1-(4-morpholin-4-yl-phenyl)-butan-1-one, 4-benzoyl-4'-methyl diphenyl sulphide, 4,4'-bis(diethylamino) benzophenone, 4,4'-bis(N,N'-dimethylamino)benzophenone, bis (eta 5-2,4-cyclopentadien-1-yl) bis [2,6-difluoro-3-(1H-pyrrol-1-yl) phenyl]titanium or, the like, or a combination thereof.

The photoinitiator may include onium salts, halonium salts, iodosyl salts, selenium salts, sulfonium salts, sulfoxonium salts, diazonium salts, metallocene salts, isoquinolinium salts, phosphonium salts, arsonium salts, tropylium salts, dialkylphenacylsulfonium salts, thiopyrilium salts, diaryl iodonium salts, triaryl sulfonium salts, sulfonium antimonate salts, ferrocenes, di(cyclopentadienyliron)arene salt compounds, pyridinium salts, or a combination thereof. The photoinitiator may include aromatic diazonium salts, aromatic sulfonium salts, aromatic iodonium salts, metallocene based compounds, aromatic phosphonium salts and silanol aluminum complexes.

Unlike in the prior art described above, the stabilizing composition and its products are not just present on the outer surfaces of the article, but the stabilizing composition and its products are present in the stratified layers through the article. This means, that a core or the article, as well as other layers may include the stabilizing composition. The stabilizing composition may be evenly or unevenly distributed throughout the stabilized article.

While in general, the stabilizing composition is formed to enhance and/or stabilize properties of the article and not the monomer bath or liquid resin, in at least one embodiment, the stabilizing composition may at the same time be utilized to enhance, adjust, and/or stabilize the monomer bath. For example, the reactive diluents named above may fulfill multiple functions of solubilizing HALS, adjusting viscosity of the bath, increasing molecular weight of the monomer bath components, increasing sensitivity of the monomer bath to the UV radiation used for polymerization and/or cure.

A method of using the stabilizing composition described herein is also disclosed. The method may include forming the composition by combining the one or more components named above to form a mixture. Any component named above may form the entire stabilizing composition, about 99, 98, 97, 96, 95, 94, 93, 92, 91, 90, 88, 85, 82, 80, 78, 75, 72, 70, 68, 65, 62, 60, 58, 55, 52, 50, 48, 45, 42, 40, 38, 35, 32, 30, 28, 25, 22, 20, 18, 15, 12, 10, 9, 8, 7, 6, 5, 4, 3, 2, 1, or 0 wt. % of the composition, based on the total weight of the stabilizing composition. The amount of each component depends on the final results to be achieved, on the phase in which the components are being supplied, and other conditions. For example, the amount of the reactive diluent(s) and/or solvent(s) should be such as to enable dispersion or dissolution of HALS, UVAs, anti-oxidants, and/or other additives such that a liquid composition is formed.

The method may further include dissolving one or more powder components such as HALS in one or more additional components, as was described above. The method may include adjusting viscosity and other properties of the stabilizing composition. The method may include preparing a monomer bath, adjusting the monomer bath, as was described above, or both. The method may include adding the stabilizing composition to the monomer bath to form a mixture, mixing the stabilizing composition with the monomer bath, or both. The method may include forming a homogenized mixture of the monomer bath and the stabilizing composition.

The method may include forming an article by an additive manufacturing process such as SLA or DLP from the mixture including the stabilizing composition, the liquid resin, and/or additional components. The forming process may include preparing a CAD file including data about an article to be formed, supplying the CAD data to a software in a computer, initiating the additive manufacturing process, exposing the mixture to radiation, polymerizing at least one or more portions of the mixture according to the CAD data, forming the article layer by layer according to the CAD data, exposing the formed article to additional UV post-cure or thermal cure, or a combination thereof.

The forming process may include one or more curing stages. The curing stages may include UV cure and/or thermal cure. The UV cure may precede the thermal cure. Alternatively, the UV cure and the thermal cure may run consecutively for at least a portion of the process.

The resultant article has enhanced resistance to heat and/or UV light post-processing as the incoming radiation and resulting free radicals formed from activation and degradation are being scavenged. As such, the article presents enhanced durability with respect to mechanical, physical, chemical, optical properties, or their combination in comparison to articles which are not stabilized by the method described herein.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An additively manufactured article stabilizing method comprising:
   prior to polymerization, adding a radiation-activated stabilizing composition including (i) a light stabilizer component based on one or more hindered amine light stabilizers, (ii) a light screener component that does not absorb light at the wavelength of polymerization and/or cure and is different than the light stabilizer component, (iii) and an antioxidant to a liquid resin capable of free radical polymerization;
   forming the article from the liquid resin, layer by layer, using radiation such that the stabilizing composition does not stabilize the liquid resin but the formed article; and
   neutralizing free radicals generated during a degradation process initiated by exposure of the article to additional radiation post-cure, wherein the article is a component of a vehicle.

2. The method of claim 1, wherein the additional radiation is a greater amount of radiation than an amount of radiation needed for initial polymerization and cure of the article.

3. The method of claim 1, wherein the stabilizing composition comprises one or more slow-acting compounds that do not actively inhibit free radical activity before or during polymerization and cure.

4. The method of claim 3, wherein the one or more slow-acting compounds remain in their unreacted state for at least several weeks after the article is formed.

5. The method of claim 4, wherein the one or more slow-acting compounds do not absorb UV light directly at a wavelength of polymerization, cure, or both.

6. The method of claim 1, wherein the HALS include one or more compounds from a class of tetramethyl piperidine derivatives.

7. The method of claim 1, wherein the forming includes UV cure, thermal cure, or both.

8. A liquid resin for additively manufacturing an article, the liquid resin comprising:
   (A) light stabilizer(s) based on one or more hindered amine light stabilizers (HALS);
   (B) reactive diluent(s) and/or
   (C) solvent(s);
   (D) photoinitiator(s);
   (E) antioxidant(s); and
   (F) UV light screener(s) that are different than the light stabilizer;
   wherein the liquid resin is to be polymerized by radiation and (A) remains in an unreacted state during the polymerization and cure of the article wherein the article is a component of a vehicle.

9. The composition of claim 8, wherein the component (A) includes one or more HALS from a class of tetramethyl piperidine derivatives.

10. The component of claim 8, wherein the component (A) includes 2,2,6,6-Tetramethyl-4-piperidinol.

11. The composition of claim 8, wherein the composition comprises 0.1 to 5 wt. % of component (A), based on total weight of the liquid resin.

12. The composition of claim 8, wherein the radiation is UV light.

13. An automotive article comprising:
   stratified layers defining the automotive component comprising slow-acting compounds configured to neutralize free radicals generated during a degradation process initiated by exposure of the article to radiation post-manufacturing such that the slow-acting compounds are incorporated in the stratified layers through the article and light screeners that absorb light in the wavelengths is less than about 370 nm, 10 to 400 nm, 100 to 400 nm, or 295 to 400 nm such that it does not screen or absorb UV light in the wavelengths of a UV radiation used for the polymerization and/or cure process.

14. The method of claim 1, wherein the article is a 3-D article formed by additive manufacturing and the article is exposed to elevated temperature to continue or expedite cross-linking after polymerization.

15. The method of claim 1, wherein the forming step is conducted with digital light processing.

16. The method of claim 1, wherein the light screeners component is 2-(2-hydroxyphenyl)-benzotriazoles, hydroxyphenyl-s-triazines, 2-Hydroxy-benzophenones, oxanilide, (2-[4-[(2-Hydroxy-3-dodecyloxypropyl)oxy]-2-hydroxyphenyl]-4,6-bis(2,4-dimethy 1pheny 1)-1,3,5-triazine; 2-[4-[(2-Hydroxy-3-tridecyloxypropyl)oxy]-2-hydroxyphenyl]-4,6-bis(2,4-dimethylphenyl)-1,3,5-triazine) (Tinuvin 400); 2-Hydroxyphenyl-s-triazine (Tinuvin 405); proprietary Hydroxyphenyl-triazine (Tinuvin 479); 95% Benzenepropanoic acid, 3-(2H-benzotriazol-2-yl)-5-(1,1-dimethylethyl)-4-hydroxy-, C7-9-branched and linear alkyl esters, 5% 1-methoxy-2-propyl acetate (Tinuvin 99-2); 95% Benzenepropanoic acid, 3-(2H-benzotriazol-2-yl)-5-(1,1-dimethylethyl)-4-hydroxy-, C7-9-branched and linear alkyl esters, 5% 1-methoxy-2-propyl acetate (Tinuvin 384-2); 2-(2H-benzotriazol-2-yl)-4,6-bis(1-methyl-1-phenylethyl) phenol (Tinuvin 900); 50% β-[3-(2-H-Benzotriazole-2-yl)-4-hydroxy-5-tert.butyl phenyl]-propionic acidpoly(ethyleneglycol) 300-ester, b) 38% Bis {β-[3-(2-H-Benzotriazole-2-yl)-4-hydroxy-5tert.butylphenyl]-propionic acid}-poly (ethyleneglycol) 300-ester, and c) 12% polyethylene glycol (Tinuvin 1130); (2-[4-[(2-Hydroxy-3-dodecyloxypropyl) oxy]-2-hydroxyphenyl]-4,6-bis(2,4-dimethylphenyl)-1,3,5-triazine; 2-[4-[(2-Hydroxy-3-tridecyloxypropyl)oxy]-2-hydroxyphenyl]-4,6-bis(2,4-dimethylphenyl)-1,3,5-triazine) (Tinuvin 400); 2-Hydroxyphenyl-s-triazine (Tinuvin 405); Proprietary Hydroxyphenyl-triazine (Tinuvin 479); or a combination thereof.

17. The method of claim 1, further comprising adding a photoinitiator to initiate free radical polymerization.

18. The method of claim 1, wherein the light screener absorbs UV light in the wavelengths of about 10 to 400 nm.

19. The method of claim 1, wherein the light screener absorbs UV light in the wavelengths of about 295 to 400 nm.

20. The method of claim 1, wherein the light screener has a screening wavelength that is less than about 370 nm.

* * * * *